United States Patent
Muraoka et al.

(10) Patent No.: US 7,861,585 B2
(45) Date of Patent: Jan. 4, 2011

(54) FLOWMETER

(75) Inventors: Manabu Muraoka, Tokyo (JP); Junzou Kimura, Tokyo (JP); Nobuyuki Fukuura, Tokyo (JP); Katsusuke Shimada, Tokyo (JP); Toshinori Fujita, Tokyo (JP); Minoru Seto, Tokyo (JP); Motoi Kanzaki, Tokyo (JP); Masahiko Matsushita, Chiba (JP); Satoshi Ishitani, Chiba (JP)

(73) Assignee: Yamatake Corporation, Tokyo (JP)

( * ) Notice: Subject to any disclaimer, the term of this patent is extended or adjusted under 35 U.S.C. 154(b) by 346 days.

(21) Appl. No.: 12/087,959

(22) PCT Filed: Jan. 22, 2007

(86) PCT No.: PCT/JP2007/050922

§ 371 (c)(1),
(2), (4) Date: Jul. 18, 2008

(87) PCT Pub. No.: WO2007/083799

PCT Pub. Date: Jul. 26, 2007

(65) Prior Publication Data

US 2010/0223992 A1 Sep. 9, 2010

(30) Foreign Application Priority Data

Jan. 23, 2006 (JP) .............................. 2006-013626

(51) Int. Cl.
*G01F 1/68* (2006.01)

(52) U.S. Cl. .................................. 73/204.25

(58) Field of Classification Search ............... 73/204.18, 73/204.22, 204.25, 293; 701/103; 250/577
See application file for complete search history.

(56) References Cited

U.S. PATENT DOCUMENTS

| 3,812,330 | A | * | 5/1974 | Bowman et al. | 377/50 |
| 3,889,255 | A | * | 6/1975 | Pettersen | 341/120 |
| 3,975,727 | A | * | 8/1976 | Mader et al. | 341/140 |
| 4,126,040 | A | * | 11/1978 | Varacins et al. | 73/293 |
| 4,233,989 | A | * | 11/1980 | Larach et al. | 600/450 |
| 4,298,948 | A | * | 11/1981 | Davis | 708/4 |
| 4,413,810 | A | * | 11/1983 | Tenberg et al. | 266/94 |
| 4,691,113 | A | * | 9/1987 | Corvazier et al. | 250/577 |
| 5,832,403 | A | * | 11/1998 | Kowatari et al. | 701/103 |

FOREIGN PATENT DOCUMENTS

| JP | 2002-081978 A | 3/2002 |
| JP | 2004-093173 A | 3/2004 |
| JP | 2004-093176 A | 3/2004 |

* cited by examiner

*Primary Examiner*—Jewel Thompson
(74) *Attorney, Agent, or Firm*—Holtz, Holtz, Goodman & Chick, PC

(57) ABSTRACT

A flowmeter includes a flow sensor capable of measuring instantaneous flow rates of forward and backward flows of a fluid, smoothing means for smoothing the measured instantaneous flow rate, an integrating counter for integrating the smoothed flow rate and outputting an integrated flow rate, determination means for monitoring the smoothed flow rate to determine whether or not the fluid is fluctuating, an auxiliary counter for integrating, in place of the integrating counter, the smoothed flow rate while the fluid is judged to be fluctuating by the determination means and when fluctuation of the fluid is detected, and control means for adding an integrated flow rate held by the auxiliary counter to that held by the integrating counter when it is judged by the determination means that the fluid has begun to flow regularly, and causing the integrating counter to restart integrating the smoothed flow rate.

6 Claims, 6 Drawing Sheets

FLOWMETER

This application is a U.S. National Phase Application under 35 USC 371 of International Application PCT/JP2007/050922 filed Jan. 22, 2007.

TECHNICAL FIELD

The present invention relates to a flowmeter capable of preventing erroneous integration of measured flow rates from being caused by fluctuation of a fluid in its flowing direction.

BACKGROUND ART

A flowmeter arranged in the supply path of a fluid (gas) for measuring the amount of supply of the fluid is generally so configured as to measure the instantaneous flow rate of the fluid by using a flow sensor and to integrate the measured flow rate. The integrated flow rate measured by the flowmeter is used as information on the basis of which the user is charged for the supply of the fluid, namely, for the amount of the fluid (gas) used. Thus, it is essential that the flowmeter should be able to measure the fluid supply amount with accuracy.

Depending on the location where the flowmeter is installed, however, it is occasionally the case that the fluid (gas) fluctuates even though the fluid is actually not in use. For example, after flowing regularly in one direction, the fluid (gas) slowly flows backward in the opposite direction. Such fluctuation of the fluid is caused by pressure imbalance between the opposite sides of the flowmeter due to conditions of use of the fluid (gas) in other supply systems, or by uneven distribution of temperature in the piping. Since the flowmeter merely integrates the instantaneous flow rate measured by the flow sensor, a problem arises in that the flow rate of the fluctuating fluid is repeatedly added up.

Conventionally, therefore, check valves are provided on the opposite sides of the flowmeter, for example. The use of the valves, however, makes the construction of the flowmeter complicated and also leads to increase in manufacturing cost. Also, a proposal has been made that in a low flow rate region where fluctuation of the fluid takes place, the integration of measured flow rates should be suspended. Where the fluid is not fluctuating but just flowing at a very small rate, however, the flow rate of the fluid fails to be measured, entailing increase in measurement error.

There has also been proposed a method in which the instantaneous flow rate of a fluid, measured by a flow sensor, is added or subtracted, depending on the flowing direction of the fluid, over a predetermined time, the resultant positive value is added to the totalized flow rate only if the positive value is greater than a preset threshold, and the resultant negative value is reset if the negative value is greater than a preset threshold (see, e.g., Patent Document 1).

Patent Document 1: Unexamined Japanese Patent Publication No. 2002-81978

In this method, however, in order to cancel out fine changes in the flow rate of the fluid in the forward and backward directions over the predetermined time, a cumulative sum of the instantaneous flow rates measured by the flow sensor is not added to the totalized flow rate until the cumulative sum exceeds the preset threshold. A problem therefore arises in that the minimum metering unit (integration unit) for the flow rate integration is determined by the threshold. In cases where the fluid fluctuates in the forward and backward directions in large quantities and at the same time the fluctuation takes places at long intervals of time, the threshold needs to be set to a relatively large value, making the minimum metering unit even larger. Further, it is necessary that the forward and backward fluctuation of the fluid be canceled out over a long period of time corresponding to the fluctuation interval, giving rise to a problem that the interval for the flow rate integration is also prolonged.

DISCLOSURE OF THE INVENTION

The present invention was created to solve the above problems, and an object thereof is to provide a flowmeter capable of measuring the flow rate of a fluid with ease and high accuracy and thus obtaining an accurate integrated flow rate without being influenced by fluctuation of the fluid attributable, for example, to pressure imbalance between the opposite sides of the flowmeter or uneven distribution of temperature in the piping.

To achieve the object, the present invention provides a flowmeter comprising:

<a> a flow sensor arranged in a flow channel for a fluid and capable of measuring instantaneous flow rates of forward and backward flows of the fluid;

<b> smoothing means for smoothing the instantaneous flow rate measured by the flow sensor;

<c> an integrating counter for integrating a smoothed flow rate obtained by the smoothing means, and outputting an integrated flow rate;

<d> determination means for monitoring the smoothed flow rate to determine whether or not the fluid is fluctuating;

<e> an auxiliary counter for integrating, in place of the integrating counter, the smoothed flow rate while the fluid is judged to be fluctuating by the determination means and when fluctuation of the fluid is detected; and <f> control means for adding an integrated flow rate held by the auxiliary counter to that held by the integrating counter when it is judged by the determination means that the fluid has begun to flow regularly, and causing the integrating counter to restart integrating the smoothed flow rate.

Preferably, the determination means judges the fluid to be fluctuating when a backward flow of the fluid is detected from the smoothed flow rate, and judges the fluid to be flowing regularly if the smoothed flow rate keeps showing a forward flow of the fluid over a predetermined period, that is, if no backward flow is detected over the predetermined period. Also, the determination means may judge the fluid to be flowing regularly as soon as the smoothed flow rate shows a forward flow rate exceeding a preset threshold.

The integrated flow rate of the auxiliary counter may be reset each time a backward flow of the fluid is detected from the smoothed flow rate. Also, the flow sensor may be a thermal flow sensor which, for example, includes a pair of thermally sensitive resistance elements arranged on both sides of a heater element in a flowing direction of the fluid and obtains a mass flow rate and flowing direction of the fluid based on a difference between temperatures detected by the respective thermally sensitive resistance elements. The flow sensor to be used may be any flow sensor insofar as it can detect a backward flow of the fluid, and it is not essential that the flow sensor should have the ability (capacity) to measure the mass flow rate of the backward flow with high accuracy.

With the flowmeter configured as above, when a backward flow of the fluid is detected from the smoothed flow rate obtained by smoothing the instantaneous flow rate measured by the flow sensor, it is judged that the fluid is fluctuating. Before the fluctuation is detected, the fluid is judged to be flowing regularly in the forward direction, and the smoothed flow rate, derived by smoothing the instantaneous flow rate measured by the flow sensor, is integrated by the integrating counter. It is therefore possible to obtain an integrated flow rate with high accuracy corresponding to the flow rate detection accuracy of the flow sensor.

When fluctuation of the fluid is detected, the auxiliary counter, instead of the integrating counter, integrates the smoothed flow rate. Then, when it is confirmed thereafter that regular flow has been recovered, the integrated flow rate held by the auxiliary counter is added to that held by the integrating counter, thus avoiding a situation where the flow rate of the forward flow recurring during the fluctuation of the fluid is repeatedly added up. The auxiliary counter integrates only the forward flow rate in such a manner that the integrated flow rate thereof is reset each time a backward flow of the fluid is detected, for example, and accordingly, the auxiliary counter eventually holds the integrated flow rate of the latest forward flow. The integrated flow rate held by the auxiliary counter is added to that held by the integrating counter, whereby an accurate flow rate of the forward flow that flowed during the fluctuation of the fluid can be added to the integrated flow rate held by the integrating counter.

If, while the fluid is judged to be fluctuating, no backward flow of the fluid is detected over the predetermined time or the forward flow rate suddenly increases, it is judged without delay that the fluid has begun to flow regularly, and the integration of the smoothed flow rate by the integrating counter is restarted. Accordingly, the original measurement function of the flowmeter is not impaired at all. Thus, even in cases where the fluid fluctuates in the forward and backward directions slowly at long intervals in large quantities, the flow rate can be highly accurately measured without being influenced by such fluctuation of the fluid.

In this manner, with the flowmeter of the present invention, when a backward flow of the fluid is detected as fluctuation, the auxiliary counter starts integrating the forward flow rate of the fluctuating fluid, and if a backward flow is detected again while the fluid is fluctuating, the integrated flow rate held by the auxiliary counter is reset. Thus, where fluctuation of the fluid is repeated, the auxiliary counter holds the integrated flow rate of the latest forward flow only. When the fluctuation of the fluid ceases and the fluid begins to flow regularly, the integrated flow rate held by the auxiliary counter is added to that held by the integrating counter, thereby adding up the forward flow rate measured during the fluctuation of the fluid and making it possible to obtain an accurate integrated flow rate of the fluid.

BEST MODE OF CARRYING OUT THE INVENTION

A flowmeter according to one embodiment of the present invention will be hereinafter described with reference to the accompanying drawings, wherein a gas meter is taken as an example of the flowmeter.

Figure 1:
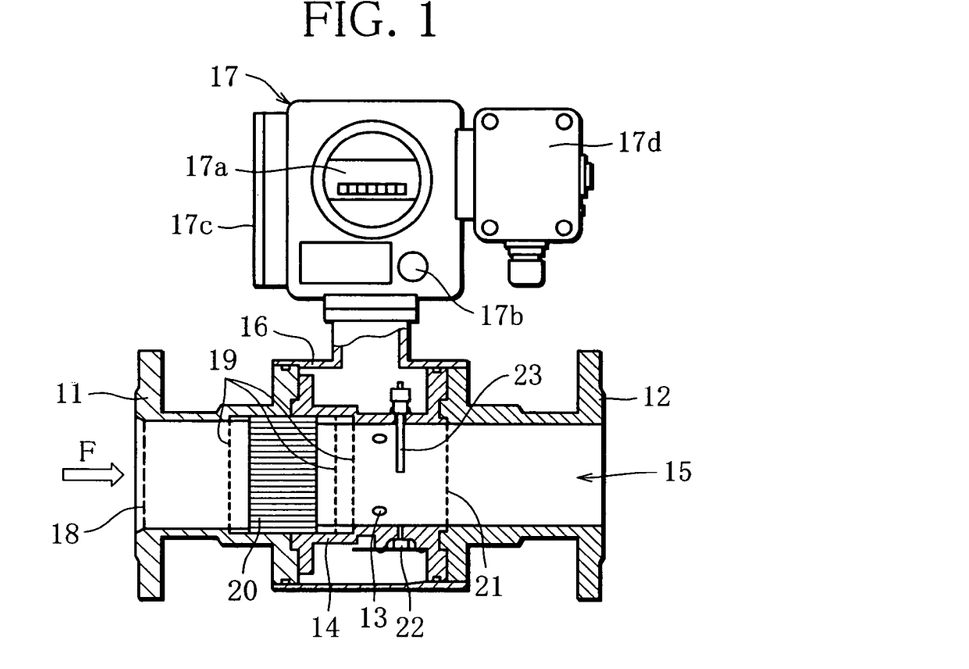
FIG. 1 is a schematic front view, partly in section, of a flowmeter according to one embodiment of the present invention.
Figure 2:
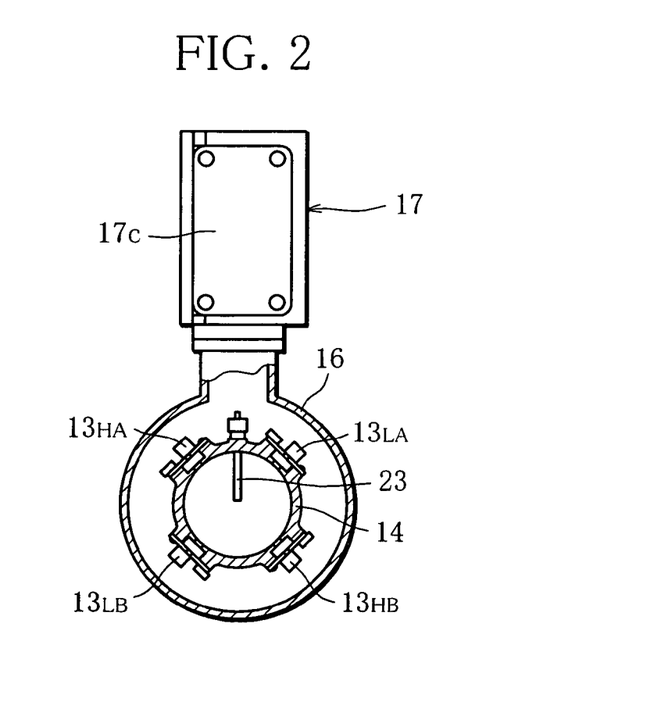
FIG. 2 is a side view, partly in section, of the flowmeter shown in FIG. 1.

FIGS. 1 and 2 illustrate a schematic construction of a flowmeter (gas meter) according to the embodiment, wherein FIG. 1 is a partially sectional front view of the flowmeter, and FIG. 2 is a partially sectional side view of the flowmeter. The flowmeter includes a conduit unit 15 forming a flow channel for a fluid (gas). Specifically, the conduit unit 15 has a pair of flanged joints 11 and 12 connected to piping (not shown) for conveying the fluid (gas), and a flow pipe 14 arranged between the flanged joints 11 and 12 and having a plurality of thermal type flow sensors 13 attached to a wall surface thereof. Also, the conduit unit 15 has a cover 16 surrounding the flow pipe 14, and a box-shaped meter body 17 is mounted to the cover 16.

The box-shaped meter body 17 contains an electronic circuit unit (not shown) comprising a microcomputer as its main component, for example. The electronic circuit unit obtains the flow rate of the fluid (gas) flowing in the conduit unit 15, on the basis of the outputs from the multiple thermal type flow sensors 13, and also integrates the measured flow rate to obtain an integrated flow rate. The meter body 17 has a front surface provided with an indicator 17a for displaying information such as the integrated flow rate obtained by the electronic circuit unit, a display mode switch 17b, etc. To respective opposite sides of the meter body 17 are attached a battery unit 17c as a source for driving the flowmeter, and a terminal box 17d connected with signal lines.

The conduit unit 15 (flanged joint 11) has a filter 18 located at a fluid inlet side to prevent entry of extraneous matter into the flowmeter. The flow pipe 14, which is interposed between the flanged joints 11 and 12 and securely joined thereto, has a plurality of flow-adjusting wire nets 19 and a honeycomb structure 20 located upstream of the thermal type flow sensors 13 arranged in the middle of the flow pipe 14, as well as a protective wire net 21 located downstream of the thermal type flow sensors 13. Further, the flow pipe 14 is provided with a pressure sensor 22 for detecting the pressure of the fluid flowing in the conduit unit 15, and a thermistor 23 for detecting the temperature of the fluid.

Figure 3:
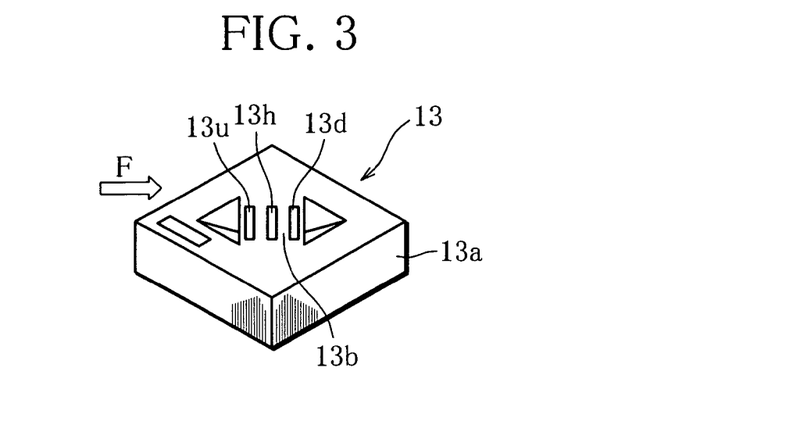
FIG. 3 is a schematic perspective view of a flow sensor incorporated in the flowmeter.
Figure 4:
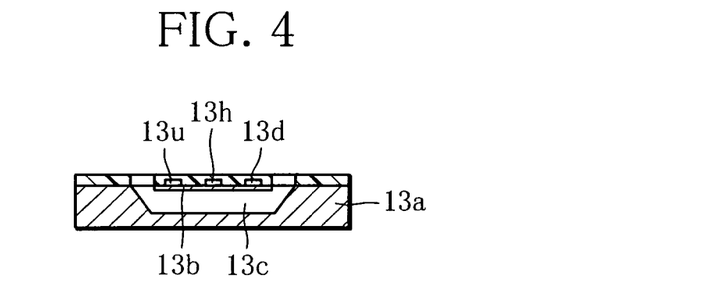
FIG. 4 is a schematic sectional view of the flow sensor incorporated in the flowmeter.

Each thermal flow sensor 13 comprises, as shown in perspective and in section in FIGS. 3 and 4, respectively, a thin diaphragm 13b formed on a substrate (silicon chip) 13a, a heat generating element (heater) 13h of platinum (Pt) or the like arranged on the diaphragm 13b, and a pair of temperature-sensitive resistance elements (temperature sensors) 13u and 13d also arranged on the diaphragm 13b and located on both sides of the heat generating element 13h in the flowing direction of the fluid. The thin diaphragm 13b extends over a concaved cavity 13c formed in the substrate (silicon chip) 13a, in a direction perpendicular to the flowing direction F of the fluid. The diaphragm 13b serves to properly position the heat generating element (heater) 13h and the temperature-sensitive resistance elements (temperature sensors) 13u and 13d in the flow of the fluid (gas).

The thermal flow sensor 13 configured as above obtains a flow velocity (flow rate) of the fluid from a difference between the temperatures respectively measured, as resistance change, by the temperature-sensitive resistance elements (temperature sensors) 13u and 13d. Specifically, as heat is generated by the heat generating element (heater) 13h, distribution of temperature around the element 13h varies due to the fluid (gas) flowing along the sensor plane such that the temperature of the downstream side is higher than that of the upstream side, and the temperature distribution varies also depending on the flow velocity (flow rate) of the fluid. Making use of the facts, the thermal flow sensor 13 derives the flow velocity (flow rate) of the fluid from a difference between the temperatures measured by the respective temperature-sensitive resistance elements (temperature sensors) 13u and 13d. Also, based on the output from the flow sensor 13, the flowing direction of the fluid is determined. Namely, if the temperature detected by the temperature-sensitive resistance element (temperature sensor) 13d is higher than that detected by the temperature-sensitive resistance element 13u, it is judged that the fluid is flowing in the forward direction. Conversely, if the temperature detected by the temperature-sensitive resistance element 13u is higher than that detected by the resistance element 13d, the fluid is judged to be flowing in the backward direction.

The flowmeter is provided, as the thermal type flow sensors 13, with two flow sensors (high flow rate sensors) 13HA and 13HB for measuring the flow rate in a high flow rate region, and two flow sensors (low flow rate sensors) 13LA and 13LB for measuring the flow rate in a low flow rate region. As shown in FIG. 2, the flow sensors 13HA, 13HB, 13LA and 13LB are attached to the wall surface of the flow pipe 14 such that each pair for measuring the flow rate in the same flow rate region diagonally face each other.

Figure 5:
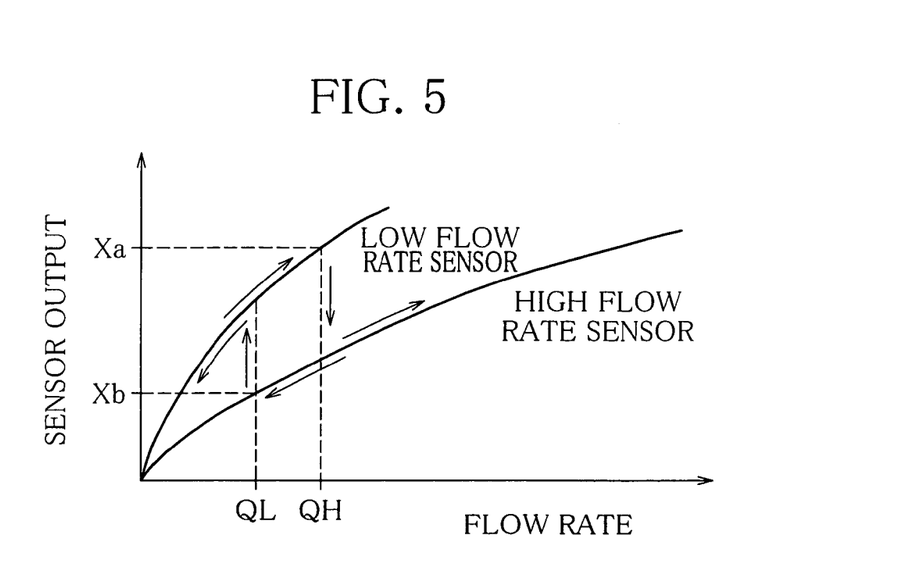
FIG. 5 shows operating characteristics of high- and low flow rate sensors and also illustrates exemplary switching of measurement flow rate regions.

The high flow rate sensors 13HA and 13HB are configured such that their heat generating elements (heaters) 13h generate a large amount of heat, compared with those of the low flow rate sensors 13LA and 13LB, whereby the flow rate measurement region can be expanded up to the high flow rate region, though the measurement accuracy in the low flow rate region is more or less sacrificed. On the other hand, the low flow rate sensors 13LA and 13LB are so configured as to exhibit high detection accuracy in the low flow rate region, compared with the high flow rate sensors 13HA and 13HB. These two types of flow sensors 13HA, 13HB; 13LA, 13LB are used to measure the flow rate of the fluid in such a manner that their flow rate measurements, are hysteretically switched in accordance with the flow rate, for example, at two preset flow-rate thresholds QH and QL shown in FIG. 5.

Figure 6:
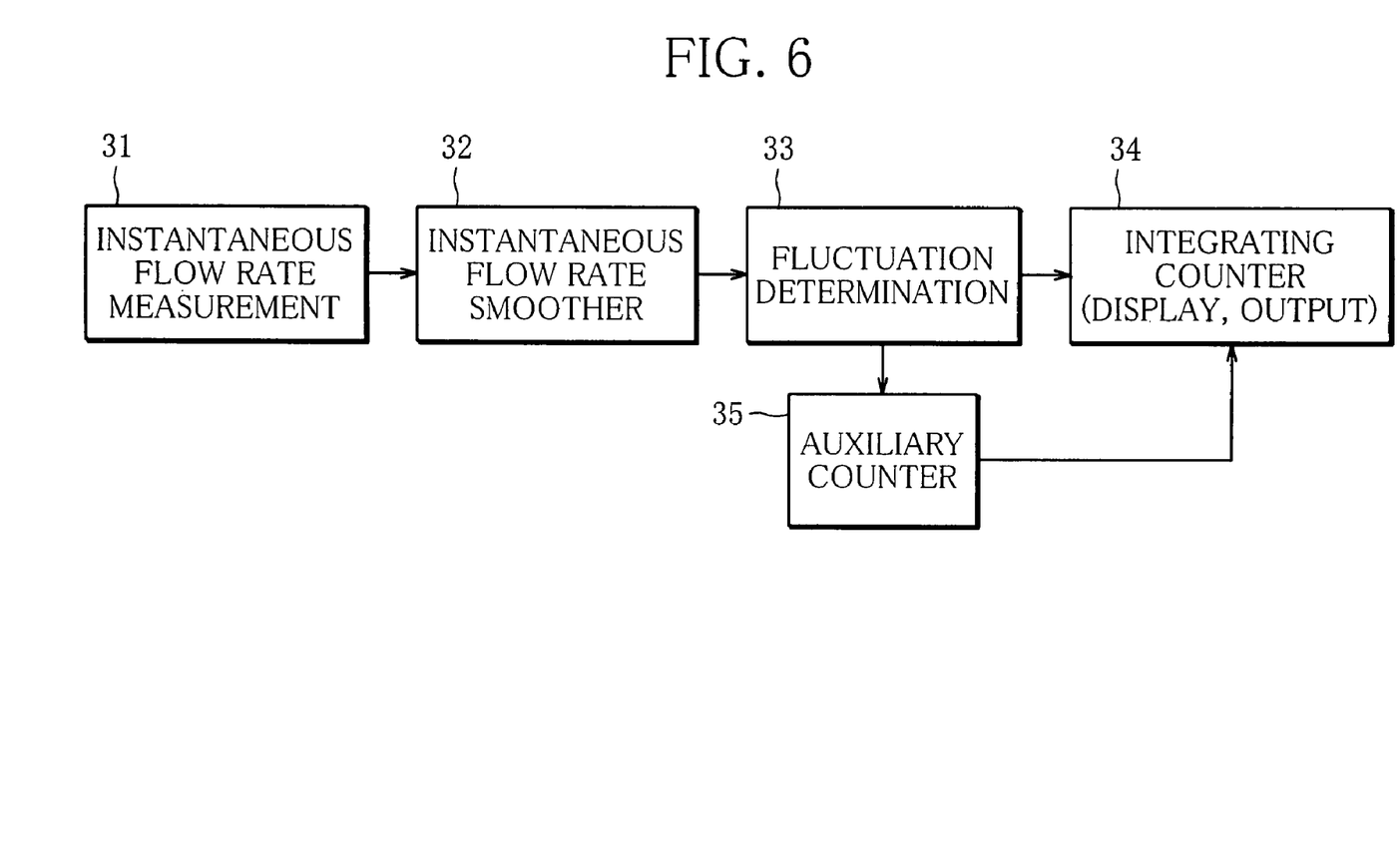
FIG. 6 schematically illustrates a flow rate integration function of the flowmeter according to the embodiment of the present invention.
Figure 7:
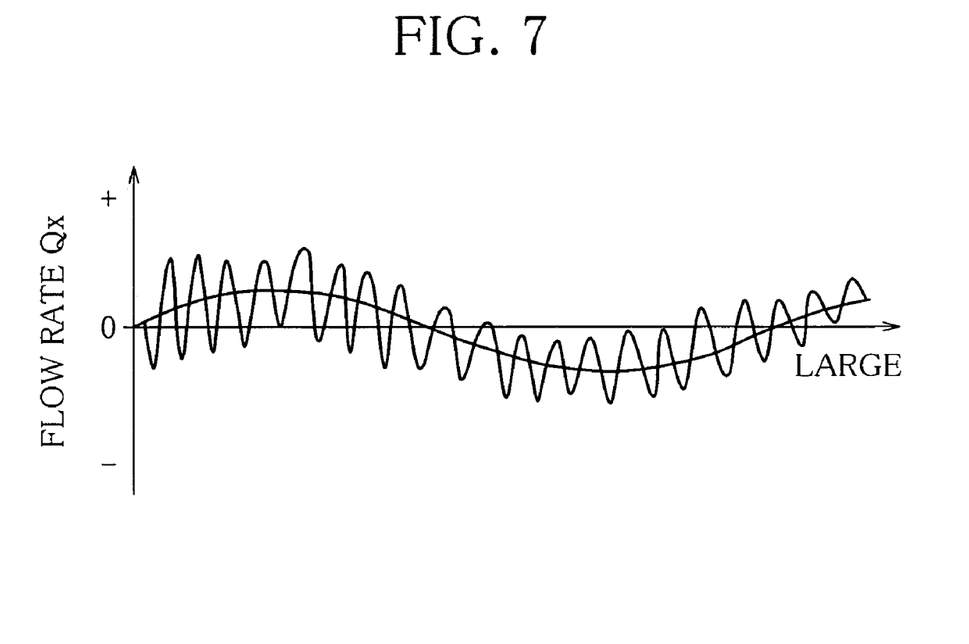
FIG. 7 shows the relationship between change in flow rate of a pulsating fluid, detected by the flow sensor, and a smoothed flow rate.

The foregoing is the basic construction of the flowmeter. The flowmeter according to the present invention comprises, as shown in FIG. 6, an instantaneous flow rate measurement section 31 for measuring the instantaneous flow rate of the fluid from the outputs of the flow sensors 13, and an instantaneous flow rate smoother 32 for smoothing the measured instantaneous flow rate. The instantaneous flow rate smoother 32 removes disturbance components such as short-period pulsation attributable to the measurement intervals, shown in FIG. 7, and backward flow of the fluid caused as a result of the reaction to the closing of fluid valves, and extracts only a long-duration variation component as a fluctuation component. For example, this smoothing process is carried out by obtaining a moving average of instantaneous flow rates measured at the predetermined measurement intervals by the instantaneous flow rate measurement section 31.

A fluctuation determination section 33 detects a backward flow component from the smoothed flow rate, thereby detecting fluctuation of the fluid. Also, after fluctuation of the fluid is detected, the fluctuation determination section 33 keeps monitoring the smoothed flow rate to detect recovery of regular flow by determining whether or not the fluid continues to flow forward over a preset period of time and also whether or not the detected flow rate shows a forward flow rate higher than or equal to a preset threshold. While the fluid flow detected by the flow sensors 13 is judged to be a regular flow, the fluctuation determination section 33 outputs the smoothed flow rate directly to an integrating counter 34, thus allowing the integrating counter 34 to obtain an integrated value (integrated flow rate) of the smoothed flow rate.

When fluctuation of the fluid is detected, the fluctuation determination section 33 stops outputting the smoothed flow rate to the integrating counter 34 and outputs the smoothed flow rate to an auxiliary counter 35 instead, to allow the auxiliary counter 35 to integrate the smoothed flow rate. Also, each time a backward flow of the fluid is detected, the fluctuation determination section 33 resets (clears) the auxiliary counter 35. On detecting recovery of regular flow, the fluctuation determination section 33 adds the integrated flow rate held by the auxiliary counter 35 to that held by the integrating counter 34 and then causes the integrating counter 34 to restart integrating the smoothed flow rate.

The following describes in more detail how fluctuation of the fluid is detected by the fluctuation determination section 33 and how the flow rate is integrated by the auxiliary counter 35 during the fluctuation of the fluid. Following the procedure schematically shown in FIG. 8, for example, the flowmeter of the present invention performs flow rate measurement. Specifically, when an instantaneous flow rate Qx is detected by the instantaneous flow rate measurement section 31 on the basis of the outputs of the flow sensors 13 (Step S1), the instantaneous flow rate smoother 32 smoothes the instantaneous flow rate Qx to remove short-duration variation components, thereby obtaining a flow rate variation component of long duration (Step S2). Subsequently, the fluctuation determination section 33 determines whether or not the smoothed flow rate Qx assumes a value equal to zero (0) or a positive value, thereby determining whether the fluid is flowing backward or not (Step S3). If no backward flow is detected, the fluctuation determination section 33 determines whether a regular flow flag F, which indicates that the fluid is flowing regularly, is set ON or not (Step S4). On confirming that the fluid is flowing regularly, the fluctuation determination section 33 allows the integrating counter 34 to integrate the flow rate Qx (Step S5).

Figure 9:
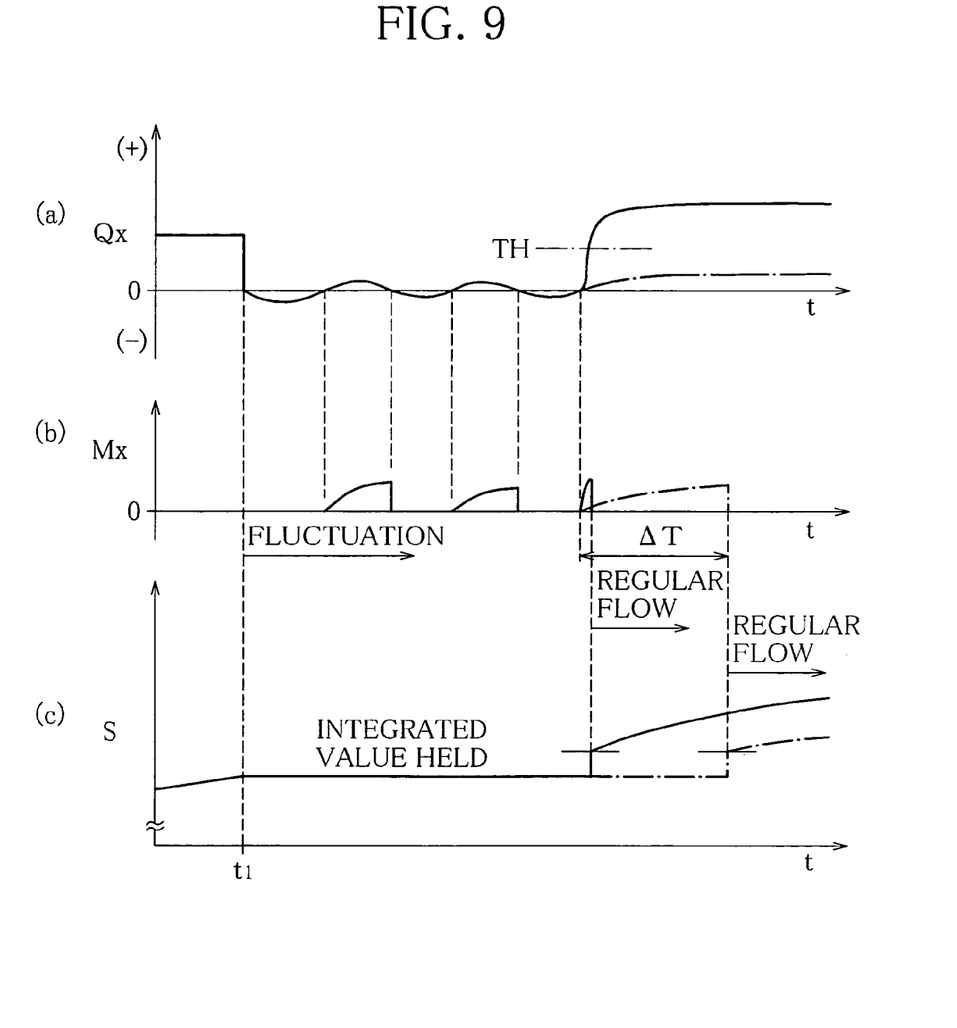
FIG. 9 illustrates the operation of the flowmeter shown in FIG. 6, that is, integrating operation of auxiliary and integrating counters with respect to flow rate change.

If the supply of the fluid (gas) is stopped at timing t1 shown in FIG. 9 and the smoothed flow rate Qx assumes a negative value, then it means that the fluid (gas) is flowing backward. Consequently, the fluctuation determination section 33 judges that fluctuation of the fluid has occurred (Step S3). In this case, the fluctuation determination section 33 clears a timer t, which is used to monitor the time for which the fluid continues to flow forward during the fluctuation, to zero (0) (Step S6), and also clears the auxiliary counter 35 to zero (0) (Step S7). Further, the fluctuation determination section 33 turns off the regular flow flag F (Step S8) and waits for the instantaneous flow rate to be input at the next measurement timing. The fluctuation determination section 33 thereafter repeats the above process until the instantaneous flow rate Qx assumes zero (0) or a positive value.

Figure 8:
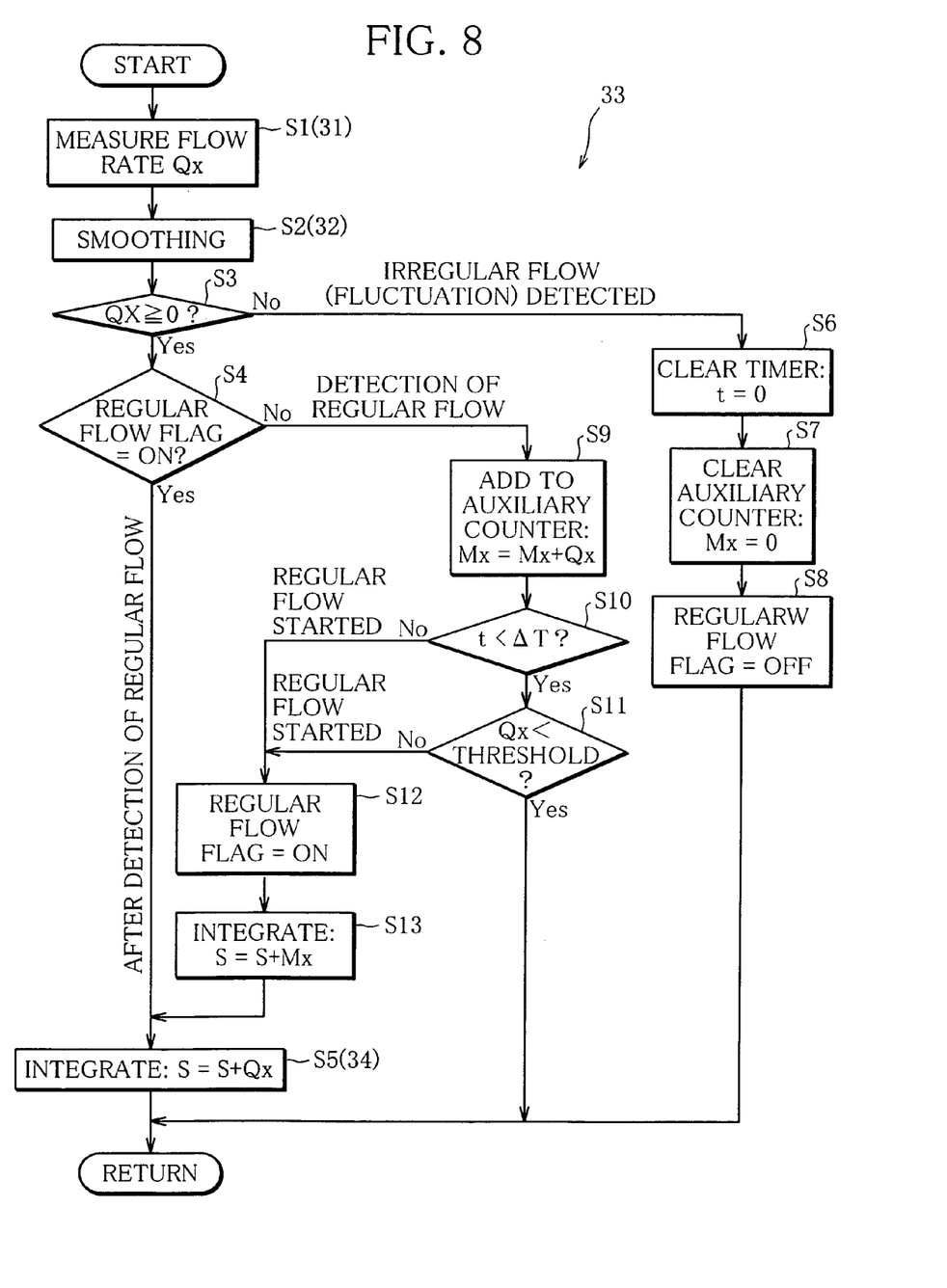
FIG. 8 shows an exemplary procedure for performing the flow rate integration, shown in FIG. 6, by the flowmeter.

If the instantaneous flow rate Qx assumes zero (0) or a positive value afterward and a positive flow rate (forward flow) of the fluid is detected, the fluctuation determination section 33 determines whether the flag F is set ON or not (Step S4). If the flag F is OFF and thus recovery of regular flow is not yet definitely established, the fluctuation determination section 33 makes a determination as to recovery of regular flow, on the assumption that the fluid is still fluctuating. The flow rate Qx detected at this time is added to the value in the auxiliary counter 35 (Step S9).

Subsequently, the fluctuation determination section 33 determines whether or not the time measured by the timer t has reached a preset time ΔT, namely, whether or not the time for which the fluid (gas) has continued to flow forward is longer than or equal to the preset time ΔT (Step S10). If the forward flow continuance time is shorter than the preset time ΔT, the fluctuation determination section 33 determines whether or not the flow rate QX shows a sudden increase exceeding a preset threshold TH (Step S11). By making these two determinations, recovery of regular flow from the fluctuation is determined.

Each time a small positive flow rate Qx is detected while the fluid is fluctuating, the auxiliary counter 35 adds up the small flow rate Qx (Step S9). Also, if a backward flow of the fluid is detected while the determination as to recovery of regular flow is being made, the fluctuation determination section 33 resets (clears) the integrated value of the auxiliary counter 35, as shown in FIG. 9, and also clears the timer t (Steps S6 and S7). Accordingly, the flag F remains in the OFF state, and the aforementioned process is repeatedly executed so long as the flag F remains OFF. In this manner, the flow rate Qx detected while the fluid keeps flowing forward is added up by the auxiliary counter 35.

If, while the determination as to recovery of regular flow is being made, the forward flow continuance time is judged to have reached the preset time ΔT (Step S10) or the flow rate Qx is judged to be greater than the preset threshold TH (Step S11), the fluctuation determination section 33 concludes that the fluid is not fluctuating any longer and has recovered regular flow. In this case, the fluctuation determination section 33 sets the flag F to the ON state (Step S12). Then, the fluctuation determination section 33 adds the integrated value Mx of the forward flow rate Qx, held by the auxiliary counter 35, to the integrated flow rate held by the integrating counter 34 (Step S13), whereby the forward flow rate detected during the determination as to recovery of regular flow (during the fluctuation) is added to the integrated flow rate of the integrating counter 34. Subsequently, the fluctuation determination section 33 causes the integrating counter 34 to restart integrating the currently measured flow rate Qx (Step S5), and the aforementioned process is repeatedly executed thereafter.

As stated above, the flowmeter of the present invention has the function whereby, while the fluid is fluctuating, the flow rate is added up using the auxiliary counter 35, and when regular flow is recovered, the integrated flow rate held by the auxiliary counter 35 is added to that held by the integrating counter 34 and the integrating counter 34 is restarted to integrate the flow rate Qx. With the flowmeter, therefore, only when fluctuation of the fluid is being detected, the auxiliary counter 35 is used to integrate the flow rate of the fluid flowing forward during the fluctuation, and when the fluid is flowing regularly, the flow rate (smoothed flow rate) Qx detected by the flow sensors 13 is added up directly by the integrating counter 34. It is therefore possible to obtain the integrated flow rate with accuracy corresponding to the measurement accuracy of the flow sensors 13.

Also, with the flowmeter of the present invention, while the fluid is fluctuating, the auxiliary counter 35 integrates the flow rate of a continuous forward flow in such a manner that each time a backward flow is detected, the auxiliary counter 35 is cleared. Accordingly, even in cases where fluctuation of the fluid is repeated, it is possible to always obtain the integrated flow rate of the latest forward flow. Namely, in the flowmeter of the present invention, when a backward flow occurs while the fluid is fluctuating, the flow rate integrated until then is cleared, whereby the backward flow is canceled out without fail and only the flow rate of the fluid flowing substantially in the forward direction can be measured. The integrated flow rate held by the auxiliary counter 35 is added to the integrated flow rate held by the integrating counter 34, and therefore, the flow rate of the fluid that flowed during the suspension of the flow rate integration by the integrating counter 34 can be added to the integrated flow rate of the integrating counter 34 without fail, as shown in FIG. 9.

Moreover, when the fluid keeps flowing forward even at a very small rate, the fluctuation determination section 33 detects such a flow as regular flow and causes the integrating counter 34 to restart the flow rate integration. Also, when the forward flow rate of the fluid suddenly increases, the fluctuation determination section 33 concludes that the sudden buildup of regular flow results from the start of supply of the fluid (gas), and causes the integrating counter 34 to restart the flow rate integration. Accordingly, the integrating counter 34 can quickly resume its normal flow rate integration. It is therefore possible to remove the influence of fluctuation caused by the closing of valves, without impairing the original function of the flowmeter.

The present invention is not limited to the foregoing embodiment alone. For example, where the flowmeter is provided with the two high flow rate sensors 13HA and 13HB and the two low flow rate sensors 13LA and 13LB as in the above embodiment, an average value of the outputs of the high flow rate sensors 13HA and 13HB or the low flow rate sensors 13LA and 13LB may be obtained as the instantaneous flow rate Qx. If, in this case, there is a large difference between the flow rates detected by the respective flow sensors 13LA, 13LB; 13HA, 13HB, the sensor outputs may be checked for deterioration and the reliable flow rate may be employed as the instantaneous flow rate Qx.

Also, while the flow rate is being measured by the high flow rate sensors 13HA and 13HB, the fluid may be regarded as flowing regularly, and only when the low flow rate sensors 13LA and 13LB are used to measure the flow rate, fluctuation of the fluid may be detected. Further, the auxiliary counter 35 may be constituted by a reversible counter so that while the fluid is judged to be fluctuating, the forward and backward flow rates of the fluid may be counted up and down, respectively, by the reversible counter. Then, when recovery of regular flow is detected, only the difference between the forward and backward flow rates, measured by the auxiliary counter 35 during the fluctuation of the fluid, may be added to the integrated flow rate held by the integrating counter 34, whereby a net integrated flow rate free from the influence of fluctuation can be obtained with accuracy. The present invention can be modified in various other ways without departing from the scope of the invention.

The invention claimed is:

1. A flowmeter comprising:
   a flow sensor arranged in a flow channel for a fluid and capable of measuring instantaneous flow rates of forward and backward flows of the fluid;
   smoothing means for smoothing the instantaneous flow rate measured by the flow sensor;
   an integrating counter for integrating a smoothed flow rate obtained by the smoothing means, and outputting an integrated flow rate;
   determination means for monitoring the smoothed flow rate to determine whether or not the fluid is fluctuating;

an auxiliary counter for integrating, in place of the integrating counter, the smoothed flow rate while the fluid is judged to be fluctuating by the determination means and when fluctuation of the fluid is detected; and control means for adding an integrated flow rate held by the auxiliary counter to that held by the integrating counter when it is judged by the determination means that the fluid has begun to flow regularly, and causing the integrating counter to restart integrating the smoothed flow rate.

2. The flowmeter according to claim 1, wherein the determination means judges the fluid to be fluctuating when a backward flow of the fluid is detected from the smoothed flow rate, and judges the fluid to be flowing regularly if the smoothed flow rate keeps showing a forward flow of the fluid over a predetermined period.

3. The flowmeter according to claim 1, wherein the determination means judges the fluid to be fluctuating when a backward flow of the fluid is detected from the smoothed flow rate, and judges the fluid to be flowing regularly as soon as the smoothed flow rate shows a forward flow rate exceeding a preset threshold.

4. The flowmeter according to claim 1, wherein the integrated flow rate of the auxiliary counter is reset each time a backward flow of the fluid is detected from the smoothed flow rate.

5. The flowmeter according to claim 1, wherein the auxiliary counter is a reversible counter.

6. The flowmeter according to claim 1, wherein the flow sensor is a thermal flow sensor including a pair of thermally sensitive resistance elements arranged on both sides of a heater element in a flowing direction of the fluid, the thermal flow sensor obtaining a mass flow rate and flowing direction of the fluid based on a difference between temperatures detected by the respective thermally sensitive resistance elements.

* * * * *